(12) United States Patent
Rössl

(10) Patent No.: US 10,755,669 B2
(45) Date of Patent: Aug. 25, 2020

(54) DISPLAY DEVICE HAVING A CONTROLLABLE PROCESSING STAGE

(71) Applicant: SES-IMAGOTAG GMBH, Graz (AT)

(72) Inventor: Andreas Rössl, Graz (AT)

(73) Assignee: SES-IMAGOTAG GMBH, Fernitz-Mellach (AT)

( * ) Notice: Subject to any disclaimer, the term of this patent is extended or adjusted under 35 U.S.C. 154(b) by 0 days.

(21) Appl. No.: 16/060,337

(22) PCT Filed: Dec. 10, 2015

(86) PCT No.: PCT/EP2015/079194
§ 371 (c)(1),
(2) Date: Jun. 7, 2018

(87) PCT Pub. No.: WO2017/097358
PCT Pub. Date: Jun. 15, 2017

(65) Prior Publication Data
US 2019/0005916 A1  Jan. 3, 2019

(51) Int. Cl.
| | |
|---|---|
| G06F 13/14 | (2006.01) |
| G09G 5/00 | (2006.01) |
| G06K 19/07 | (2006.01) |
| G06K 19/077 | (2006.01) |
| G06K 19/02 | (2006.01) |
| G06K 7/10 | (2006.01) |
| G08B 13/24 | (2006.01) |
| H04B 5/00 | (2006.01) |
| G09F 3/20 | (2006.01) |
| H04W 4/80 | (2018.01) |
| G09G 5/393 | (2006.01) |
| H04W 52/02 | (2009.01) |

(52) U.S. Cl.
CPC ......... *G09G 5/006* (2013.01); *G06K 7/10297* (2013.01); *G06K 19/027* (2013.01); *G06K 19/0705* (2013.01); *G06K 19/0723* (2013.01); *G06K 19/0724* (2013.01); *G06K 19/07707* (2013.01); *G08B 13/2448* (2013.01); *G09F 3/208* (2013.01); *G09G 5/393* (2013.01); *H04B 5/0056* (2013.01); *H04W 4/80* (2018.02); *H04W 52/027* (2013.01); *H04W 52/0229* (2013.01); *G09G 2330/021* (2013.01); *G09G 2370/025* (2013.01); *G09G 2370/16* (2013.01); *G09G 2380/04* (2013.01)

(58) Field of Classification Search
CPC .......... G06F 3/14; G09G 5/363; G09G 5/006; G09G 5/001; G06T 1/20
USPC ....................................................... 345/520
See application file for complete search history.

(56) References Cited

U.S. PATENT DOCUMENTS

| | | | | |
|---|---|---|---|---|
| 2012/0287095 A1* | 11/2012 | Cote | ...... | G06Q 10/08 345/204 |
| 2014/0256372 A1* | 9/2014 | Karhuketo | ............... | H04B 1/59 455/501 |
| 2017/0330064 A1* | 11/2017 | Kim | ...... | G06Q 30/06 |

* cited by examiner

*Primary Examiner* — Gordon G Liu
(74) *Attorney, Agent, or Firm* — Dennemeyer & Associates, LLC

(57) ABSTRACT

Display device comprising a first radio interface which is connected to a processing stage of the display device for communication with a base station according to a first communication protocol for the purpose of controlling states of the processing stage and an additional interface which is connected to the processing stage for contactless communication according to a second communication protocol with a communication device which is different from the base station for the purpose of controlling states of the display device.

13 Claims, 3 Drawing Sheets

DISPLAY DEVICE HAVING A CONTROLLABLE PROCESSING STAGE

TECHNICAL FIELD

The invention relates to a display device comprising a first radio interface which is connected to a processing stage of the display device for communication with a base station according to a first communication protocol for the purpose of controlling states of the processing stage.

BACKGROUND

A known display device, also referred to as an electronic price tag or also as "Electronic Shelf Label," abbreviated ESL, in the technical jargon, is in radio contact with a base station during operation and controlled with regard to its operating states with the aid of the base station. During operation, price and/or product information on the products with which the ESL is associated is reproduced with the aid of a display integrated in the ESL. The ESL is usually fastened to a shelf rail of a shelf on which the product in question is stored or displayed. In the case of an ESL which is supplied autonomously with electric power, for example with the aid of a battery or of a solar module which charges an accumulator battery when exposed to light, a maximally reduced energy consumption plays a role in achieving a longest possible useful life. The wireless protocol used for the radio communication with the base station is one aspect which takes this aim into consideration. According to this wireless protocol, for each ESL, only relatively short pre-defined time periods for communication with a base station are available. Another aspect is the provision of operating states with very different power consumption, namely with a sleep or rest state when no communication with the base station can be carried out and with an active state when a communication with the base station can be carried out. The interaction of these two aspects enables a longest possible operation of the ESL in a state with exceedingly low energy consumption, interrupted by short time periods in which, in comparison thereto, the energy consumption is relatively high. This operating scheme has proven to be very effective in routine display operation in salesrooms of a retailer such as, for example, a supermarket, when all that is involved is communication with the base station and processing of the information to be displayed. However, in practice it has been found that sometimes a more rapid reaction speed of the ESL or an improved functionality is desirable, in particular in operating situations which differ from routine display operation.

Therefore, the aim of the invention is to provide an improved display device.

SUMMARY OF THE INVENTION

This aim is achieved with a display device according to claim 1. The subject matter of the invention is therefore a display device comprising a first radio interface which is connected to a processing stage of the display device for communication with a base station according to a first communication protocol for the purpose of controlling states of the processing stage, and an additional interface which is connected to the processing stage for contactless communication according to a second communication protocol with a communication device which is different from the base station for the purpose of controlling states of the display device.

The measures according to the invention are associated with the advantage that, for the first time, the states of the display device can be influenced in a manner which is uncoupled from the rigid time scheme of the first communication protocol used between the display device and the base station thereof, for the scheduled operation, that is to say, in general, the display of information on products. The second interface and the electronic connection thereof to the processing stage as well as the use of a second communication protocol which is different from the first communication protocol form the basis of this new and advantageous functionality. In reference to the two communication protocols, it should be mentioned that they preferably have a different behavior with regard to their temporal communication availability. The first communication protocol provides a temporally very limited communication capability in comparison to the second communication protocol. Consequently, in contrast to the known functionality, a rapid reaction to commands can then be achieved at any point in time with the aid of a communication via the second interface, in order to influence or control the states. In the broadest sense, the measures according to the invention here implement a virtual "key" (for activating a function) or a "key field" (for activating different functions) of the display device, wherein, in the "actuation" of a virtual key, a prompt reaction of the display device occurs. Consequently, the invention solves a problem which is inherently rooted in the first communication protocol and the origin of which arises from the aim of a lowest possible energy consumption.

Additionally, particularly advantageous designs and developments of the invention result from the dependent claims and the subsequent description.

A state should be understood to mean both a rest state with practically no energy consumption (for example, due to switched-off supply voltage or interrupted data processing) or with a relatively low energy consumption (due to strongly limited functionality or processing capacity), as well as an operating or processing state with relatively high energy consumption in comparison thereto. The influencing of a state should comprise both state changes or the performance of processing activities in the operating state or rest state class and also the transition from a rest state to an operating state and the transition from an operating state to a rest state.

In the context of the invention, the control of the states can extend to known operating states, the control and influencing of which can also occur with the aid of a communication via the first radio interface. For this purpose, the processing stage is configured to receive and process commands via the second interface. However, entirely new states of the display device can also be created and controlled or influenced, which entail an improved or enlarged functionality of the display device which will be discussed in further detail below. These new states can be implemented either by the processing stage or by the additional interface or also by the interaction of the two components.

The explained new functionality is available simultaneously or in parallel with the known functionality. The commands received via the second interface can be prioritized compared to commands received via the first radio interface, so that the communication via the first radio interface is interrupted or suspended as long as the communication runs through the additional interface. However, the prioritization can also be reversed. In addition, depending on the operating state in question, there can be an individual prioritization for the respective state.

The first communication protocol used in the first radio interface can be implemented, for example, according to the "ZigBee" standard, the "BlueTooth" standard or according to a proprietary protocol. The first radio interface as well as optionally the processing stage have a corresponding configuration of the hardware as well as appropriate software executed on this hardware, in order to allow the communication according to the respective communication protocol.

According to a preferred embodiment example, a proprietary radio communication protocol which implements a time slot communication method is used, with the aid of which multiple display devices can communicate with a base station. A base station is used as interface between a wired communication with, for example, a data processing device (for example, a server) and a wireless communication with other devices, in the present case the display devices. According to this protocol, the display devices can first be registered in or associated with a base station in order to be usable for radio communication with this base station. During the registration, a predefined, individual time slot for the communication with the base station is assigned to each display device. In the process, for example, within n seconds, for example, 15 seconds, m time slots, for example, 255 time slots, are used. The n seconds form a time slot cycle which recurs continually, and which is also referred to as synchronization cycle. In this time slot communication method, there are thus m time slots available within a synchronization cycle for a communication with display devices. Each of the display devices is associated with one of the time slots, wherein, several display devices, for example, 2, 3 or 4 display devices, can also be associated with a given time slot. Within one minute, 4 synchronization cycles occur, each with 255 time slots, so that with 2 display devices per time slot, for example, a total number of 2040 display devices can be addressed. If, in the salesrooms of a retail company, several base stations are installed, groups of display devices associated with the respective base station can be controlled.

With the aid of a synchronization signal structure (for example, a relatively short signal at the start of the respective time slot) emitted by the base station in each of the time slots, the display devices can be synchronized for the first time with the time frame of the time slot communication method, in order to start the communication operation with the base station, they can be resynchronized during the course of the operation if they lose the synchronized state for any reasons, and they can be kept synchronized in the case of smaller deviations from the synchronized state, which are caused by inaccuracies such as drift of their internal clock, for example.

According to the first communication protocol, each time slot is characterized by a unique time slot symbol, wherein the base station is configured so as to emit for the instantaneously present time slot a synchronization data signal including the time slot symbol. The display device is configured to switch from a sleep or rest state, hereafter referred to in short as sleep state, to an active state at a wakeup time and receives the synchronization data signal in the active state. When the time slot symbol received indicates a time slot intended for the display device, the display device defines a new wakeup time corresponding to the next occurrence of the time slot intended for it in a time slot cycle following the instantaneously present time slot cycle.

Each display device ascertains its synchronization with the base station based only on the factor of the detection of the time slot symbol which occurs at the time expected by it or in an expectation time window and which indicates the time slot intended for it. After the display device has ascertained its synchronization as explained above, it is in principle sufficient for it to switch back to the sleep state, since the next wakeup time is known automatically from the time frame of the time slot communication method, which is known to it. The defining of the new wakeup time can thus be limited to the restarting, for example, of a time control stage (for example, a timer) of the display device with the timing parameters already used previously for the switch from the sleep state to the active state. Subsequently, the display device can then be switched again to the sleep state and remain there until, triggered by the time control, a waking up and switching from the sleep state to the active state is carried out at the new wakeup time in the next time slot cycle. However, the display stage does not necessarily have to remain in the sleep state for the rest of the time slot intended for it, instead, it can also process additional tasks in an active state during the time slot or also during the time slot cycle. The time control explained above then works in the background.

The time slot symbol can in principle be selected as desired. It has been shown to be particularly advantageous if the time slot symbol is formed with the aid of a hardware address of the wireless tag, which uniquely defines the wireless tag, preferably by means of the lowest-value bit or the lowest-value byte of the hardware address.

A display unit of the display device is electronically connected to the processing stage and can be controlled with its help. The display unit can be implemented, for example, with the aid of LCD technology, but preferably also using extremely energy-saving electronic ink technology (also referred to as E Ink as a synonym for electronic paper).

For example, the hardware of the display device can be implemented as follows. A battery which provides a supply voltage of three volts feeds a microcontroller which essentially implements the processing stage. The microcontroller can comprise an internal memory or else it can be connected to an external memory.

The microcontroller can comprise, as a component of the first radio interface, an integrated co-processor and additional electronic components for implementing the first radio interface or be coupled thereto, so that the communication is carried out according to the first radio communication protocol with the aid of the co-processor. Connected thereto is a first antenna of the first radio interface.

In addition, the hardware of the display device comprises said display unit which, in addition to the mentioned display technology, can also have a second microcontroller coupled to the first microcontroller, in order to autonomously perform display-specific tasks assigned to it.

The first microcontroller is additionally coupled to the second interface.

The second interface can be configured in a capacitive and/or inductive manner for communicating. According to a preferred configuration, it is configured for communication according to an RFID specification (or an RFID standard) such as, for example, ISO/IEC 10536, 14443, 15693, 10373 or VDI 4470, 4472 or ISO/IEC 18000 or EPCglobal or ISO/IEC 15961, 15962 or future specifications. Not only does this enable reliable communication, in particular over relative short distances, so that a pairing between the display device and a communication device configured as RFID reading device (RFID reader) is ensured already as a result of the required spatial proximity of the two devices with respect to one another, but it also enables the supply with electric energy via the field (for example, electrostatic, magnetic, electromagnetic dipole field) used for the communication. It has been found to be particularly advantageous if the second interface is configured for communication according to an NFC specification such as, for example, ISO/IEC 13157, -16353, -22536, -28361 or future specifications. This entails the advantage that the display device can also communicate by itself in the active NFC mode, that is to say in the reader mode.

As mentioned above, the display device has the active state and the sleep state, wherein these states are provided with the aid of the processing stage. In the assumed active state, the processing stage is configured to receive data via the first radio interface. In the assumed sleep state, no readiness to receive data via the first radio interface exists for the processing stage. According to an aspect of the invention, the display device is now configured in such a manner that, at least also during the sleep state, a readiness to receive data via the additional interface exists for the processing stage. This configuration does not have to be limited only to the sleep state; instead it can also be available for the active state. This configuration can be provided, for example, by a connection of the hardware implementing the NFC or RFID interface to the first microcontroller with the aid of a data bus or a series connection for data communication and by a coupling of the NFC or RFID hardware to an interrupt input of the first microcontroller. In this way, for example when the additional interface is activated from outside of the display device with an RFID- or NFC-capable device, an interrupt can be triggered in the first microcontroller, and there, with the aid of suitable software routines, a readiness to receive for data reception via the additional interface is established.

To the extent that there is an RFID- or NFC-based implementation of the additional interface, the supply voltage, which is generated with the aid of the RFID- or NFC-capable device in the display device (for example, by inductive coupling) for the operation of the RFID or NFC hardware, can also be used for the operation of the first microcontroller, and as a result an improved useful life of the battery can be achieved. For the purpose of the selection of the supply voltage necessary for the operation of the first microcontroller, supply voltage switching means can be provided which make the selection of the supply source for the voltage supply of the first microcontroller depending on the availability and the quality of the supply voltage provided with the aid of the additional interface.

The occurrence of a usable supply voltage at the NFC or RFID module for the operation of the additional interface, that is to say of the NFC or RFID module, can also be used as trigger for the mentioned interrupt on the first microcontroller, since it is only thereafter that a data transmission via the additional interface is possible and/or since with this supply voltage as well an operation of the first microcontroller for processing data is possible.

According to another aspect of the invention, the processing stage is configured to assume a delivery state. This new state differs from the usual state behavior in that a readiness to receive data via the first radio interface at no time exists. In the delivery state, the processing stage can in fact not switch by itself to the active state. This delivery state is assumed in the factory in the production of the display device. In the delivery state, there is no energy consumption, since, the processing stage does not have to be supplied or is not supplied at all with electrical power. It can even be separated from the internal battery. The same applies to all the other electronic components of the display device.

This differs greatly from known measures in which the processing stage is already fully operational at the time of its delivery, that is to say it has been switched from its sleep state to the active state according to an internal timing, and, at more or less periodic intervals, for example approximately every 30 minutes, it attempts to contact a base station in order to be connected thereto.

The fact that the processing stage is in the delivery state can be registered in one of its memory components (for example, EEPROM) by the value of a bit which is verified by the processing stage after the first-time start of the processing stage, in order to initiate the measures necessary for normal operation.

In addition, with the help of the additional interface, the display device is configured to start the readiness to receive of the processing stage for receiving data via the first radio interface. This can occur from outside as explained above, for example, by the buildup of an operating voltage during an activation of the additional interface. Moreover, the second interface can also verify the information which establishes whether the processing stage is started for the first time, and accordingly it can activate the voltage supply for the processing stage by the internal battery, whereafter the autonomous data processing of the processing stage is ensured.

Another aspect of the invention relates to the first-time connection setup with a base station. In a deviation from known measures in which, after successful radio contact establishment with a base station, a network key for the encoded communication with the base station is transmitted via a communication with said base station to the display device, the invention discloses a substantially more secure connection setup with the base station. For this purpose, the processing stage is configured to receive, before or after the first-time start of its readiness to receive a network key via the additional interface for the purpose of encoded communication with the base station, and to assume, after reception of the network key, a connection setup state for the purpose of setting up a radio connection with the base station using the network key via the first radio interface. The network key for communication for the first radio interface is thus transmitted via an interface other than the first interface. It is only thereafter that the connection setup via the first radio interface using the network key starts. To the extent that the additional interface is configured as an RFID or NFC interface, interception of the transmitted network key can be practically ruled out for two reasons, since, on the one hand, the RFID or NFC communication requires proximity of the communicating devices, and since, on the other hand, the network key to be transmitted can already be transmitted in an encoded RFID or NFC communication.

In a manner similar to the delivery state, the invention offers for the first time the possibility of switching a display device which is already in use, for example, for storage purposes in an operating state, concretely to an absolute rest state in which there is practically no power consumption. For this purpose, the display device is configured to assume a storage state, in particular after leaving a delivery state for the first time, wherein, in the storage state, no readiness to receive of the processing stage for data via the first radio interface exists. In this storage state as well, the voltage supply by the battery can be switched off, and the state can itself be stored in a memory even with the aid of a value of a bit, so that, after renewed activation, the correct measures for the continuation of the operation can follow.

Two possibilities are considered for entering the storage state. The processing stage can be configured to assume the storage state as a consequence of a reception of data via the first radio interface. This is advantageous if the storage state is to be triggered via the radio network of the base station, that is to say, for example, by the merchandise management system of the retailer. However, the processing stage can also be configured to assume the storage state as a consequence of a reception of data via the additional interface, which is advantageous if this state is to be triggered only by direct interaction with a portable communication device of an employee of the retail company.

It is particularly advantageous to configure the display device with the help of the additional interface so as to restart the readiness to receive of the processing stage for receiving data via the first radio interface. Here, measures can be taken, which were explained in connection with the delivery state and the first-time establishment of the readiness to receive of the processing stage.

According to another aspect of the invention, the processing stage is configured to receive data representing operating parameters via the additional interface and to store this data, wherein the operating parameters influence the states of the display device in the communication with the base station. This can involve, for example, latency settings the purpose of which is to achieve, during the communication with the base station, a more rapid reaction of the display device, or to define a slower behavior which, however, manifests itself in a longer useful life of the battery.

In routine display operation, a display device is connected logically to a base station, that is to say registered in the base station, and can receive commands and data only from it. In a system consisting of multiple base stations in which, for example, a first group of display devices is associated with a first base station, and a second group of display devices is associated with the second base station, one display device of the first base station should be associated with the second base station. With a conventional display device which would first have to detect, with the help of the first communication protocol, the changed radio network environment resulting, for example, from moving the display device from site A to site B, this new association would often last for a longer time period than that expected by the operating personnel, which can lead to misunderstanding in dealing with the display device right up to a damage event. To prevent this problem, the processing stage, with the aid of the data that can be received via the additional interface, is configured to receive and execute a new connection command for renewed assuming of a connection setup state for the purpose of setting up a radio connection with a base station. Thus, without taking into consideration the new association functionality which exists automatically with the help of the first communication protocol, an ad-hoc new association of the display device with a base station can start.

It has been shown to be particularly advantageous if, during the establishment of the new connection, the processing stage is configured to visualize state information which represents the presence of the connection setup state. This feature allows the personnel who transmitted the new connection command via the additional interface with the help of a portable communication device to immediately verify the success of the command transmission.

In particular, when a display device is obviously causing problems because, for example, it displays nothing or an incorrect price or incorrect product information although it should already have been supplied with other data via the base station, the invention allows an additional advantageous service functionality. According to this aspect of the invention, the display device comprises a status memory for storing status data which represents the current state and/or a past state, wherein the display device is configured to assume, with the help of a status readout command received via the additional interface, a status data readout state in which the status data is read out and delivered via the additional interface. Here, the status memory can be located in the internal memory of the first microcontroller, and the processing stage reads out said status memory and transmits the status data via the additional interface.

According to a preferred embodiment example, the additional interface is configured to execute the readout command and to access and read out the status memory, wherein, the status memory is part of the processing means but preferably part of the additional interface. According to the last-mentioned variant, the processing stage must, at the time of the saving of its status in memory, be able to access the status memory of the additional interface. However, this entails the decisive advantage that, in the case of a failure or in the case of a total failure (hardware damage without possibility of access to a component of the hardware) of the processing stage, the memory content can still be read out of the status memory of the additional interface with the aid of the additional interface. If the additional interface is an RFID or NFC interface, there is also the advantageous circumstance, which is unexpected and observed for the first time by the applicant, that such interface hardware is extremely robust and usually still works even if the hardware of the processing stage has already been destroyed. The access to the status memory can be organized according to an access hierarchy, so that different users working with the system can access different information. For example, only the manufacturer of the display device has access to the deepest access level. Thus, at this level, for example, important information concerning the identification number, the operating parameters such as, for example, the operating voltage or operating temperature can be read out in order to verify, for example, warranty claims of a client. This represents a considerable simplification with respect to service aspects.

According to another aspect of the invention, the processing stage is configured to receive a status display command via the additional interface and, as a consequence of such a reception, to assume a status display state in which a status information item which is stored in a status memory and represents an operating state of the display device is delivered to a display module of the display device for the purpose of displaying the status information. This measure provides a simple functional test. If the display device reacts with the display of its status, a correct functioning can be assumed, while otherwise the display device would have to be removed from its shelf to be serviced.

An additional aspect of the invention relates to the configuration of the process stage for receiving a service-side display command via the additional interface as well as to its configuration as a consequence of such a reception for assuming a service-side display state, in which service information stored in a service-side memory is delivered to a display module of the display device for the purpose of displaying the service information, wherein the service information has been received beforehand via the first radio interface and stored in the service-side memory. This functionality enables the provision of, for example, stock level information on a certain product. A practical application case is one in which an employee of a retail company now no longer needs to go into the warehouse to check the stock level if a product is missing on the shelf, instead he/she simply uses his/her portable communication device to activate the query in the display device, and, in accordance with the display, he/she can decide whether it is appropriate at all to go into the warehouse to get merchandise for the shelf.

The stock level was stored beforehand by a merchandise management system of the retailer with the aid of the base station in the course of a communication via the first radio interface to the display device and stored there in the service-side memory.

According to another aspect of the invention, the processing stage is configured to receive display data via the additional interface and to store the data for the purpose of later visualization and/or immediate visualization of display information represented with the help of the display data. This new functionality enables an up-to-now impossible interaction with the display device. Thus, in the case of a crisis, for example when all the products on a shelf have reached their expiration date and the products have to be manually removed immediately, an employee of the retail company can input a message to the clients in the display device via the additional interface with the aid of his/her portable hand communication device. In the case of a milk shelf, the message can be as follows "We ask for your patience. Fresh merchandise will be available within the next 5 minutes." This interaction with the personnel at the site of the display device can be transferred with the aid of the display device via the first radio interface to the merchandise management system, so that the corresponding processes (in the present case: compulsory emptying of the shelf because the expiration date has been exceeded and subsequent filling of the shelf with fresh warehouse merchandise) can also be displayed correctly there.

In this communication via the additional interface, the entire electrical supply of the ESL can occur with the aid of the communication signals, as a result of which there will still be no load at all on the internal battery, which has an advantageous effect on the maximum expected operating time of the ESL.

In principle, this advantageous supply of the ESL can also be used in other cases of communication, in which corresponding signals are available in the additional interface. The ESL can be configured internally in such a manner that the supply of the ESL by the internal battery is interrupted if signals that can be used for the voltage supply are present in the second interface. This can occur by means of a controllable configuration of the internal voltage supply of the ESL as well as by means of a control signal which can be generated by the additional interface (see, for example, "supply control signal VC" in the description of the embodiment examples) for the control of the internal voltage supply. The internal voltage supply can also be separated by switching means from the electronic components of the ESL which are to be supplied. At the same time, using said signals, the voltage supply means of the additional interface generate the supply voltage necessary for the operation of the ESL or of the respective active electronic components and supply them therewith.

A display device according to the invention can also be configured so that, after leaving the delivery state, it assumes the delivery state again. For this purpose, the processing stage is configured to detect and execute a first reset command (first master reset command). This first reset command can be received via the first radio interface by the base station. However, according to a preferred embodiment, the processing stage is configured to receive and execute a first reset command which is received with the aid of the additional interface for assuming the delivery state. After the execution, the display device is again in the delivery state.

A display device according to the invention can also be configured so that, after leaving the storage state, it assumes the storage state again. For this purpose, the processing stage is configured to detect and execute a second reset command (second master reset command). This second reset command can be received by the base station via the first radio interface. However, according to a preferred embodiment, the processing stage is configured to receive and execute a second reset command which is received with the aid of the additional interface, for assuming the storage state. After the execution, the display device is again in the storage state.

For the two reset commands it can be advantageous if the execution of the commands in the display device depends on whether a correct password was transmitted during the course of the command transmission. The password can have been set beforehand, on the one hand, with the aid of the base station via the first radio interface or, on the other hand, preferably via the additional interface. The administrative rules for the respective password can be set, for example, so that the password relevant for the first reset command can be set only by the manufacturer of the ESL, while the password relevant for the second reset command can be set by the manufacturer of the ESL and/or the user of the ESL (that is to say the operator of the supermarket). Thus, abuse or theft of the ESL can be prevented, since its further use would be possible only to a very limited extent, if possible at all.

These and other aspects of the invention result from the figures explained below.

BRIEF DESCRIPTION OF THE FIGURES

Below, in reference to the appended figures, the invention is explained again in greater detail based on embodiment examples, although it is not limited to said embodiment examples. Here, in the different figures, identical components are provided with identical reference numerals. Diagrammatically shown are.

DESCRIPTION OF THE EMBODIMENT EXAMPLES

Figure 1:
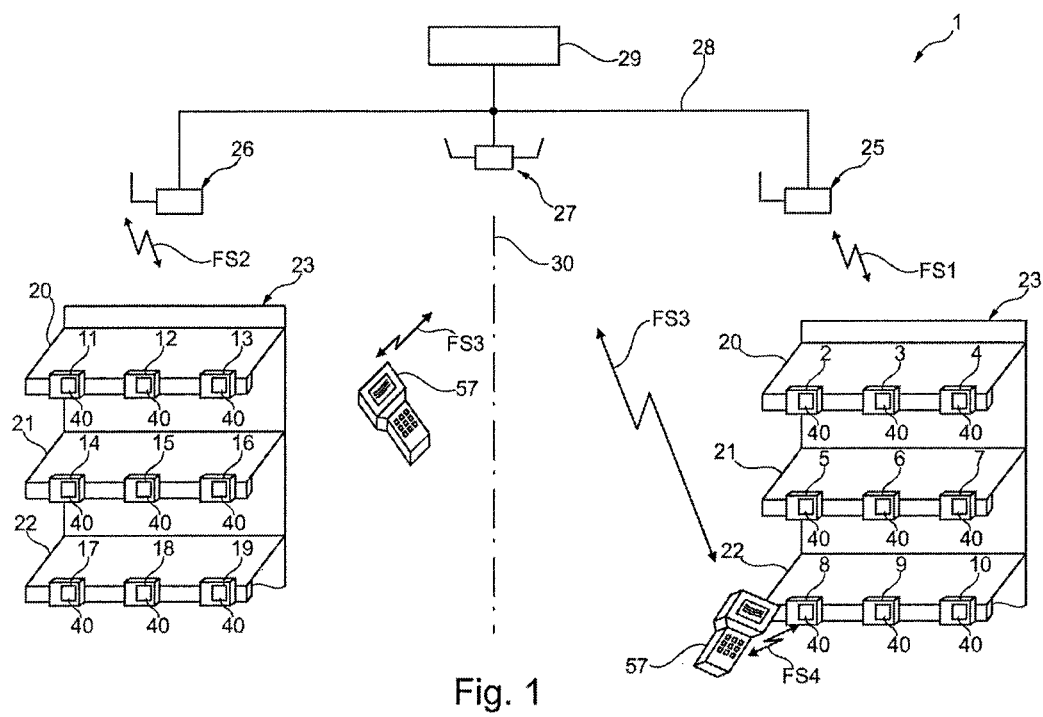
FIG. 1 a system according to the invention.

FIG. 1 shows a system 1 according to the invention which is installed in the spaces of a supermarket and used for radio communication with electronic price display tags which implement display devices according to the invention, hereafter abbreviated ESL 2-10 and ESL 11-19. Each ESL 2-19 has a display 40 and is attached to shelf bottoms 20-22 of a shelf 23, corresponding to products (not represented) positioned on the shelf bottom, with the help of which price and/or product information on said products is displayed. This system also has two base stations 25 and 26, wherein the first base station 25 is in radio contact with ESL 2-10, symbolized by the first radio signals FS1, and the second base station 26 is in radio contact with ESL 11-19, symbolized by the second radio signals FS2, with the aid of a proprietary first communication protocol. The logical association (for example, by means of different radio channels) of the groups of ESL 1-10 and 11-19 with the respective base station 25, 26 is visualized with the help of the line 30. Here, it is also noted that there is no need for a spatial separation of the radio ranges, as represented in FIG. 1 for the sake of simplicity of representation. The radio ranges can also overlap (for example, in certain areas). Moreover, the system 1 has a WLAN access point, hereafter referred to in short as access point 27, which, represented centrally, provides radio coverage of the two areas on the left and on the right of the line 30. However, multiple access points 27 can also be present, to provide the entire sales area with radio coverage. The system 1 also comprises portable electronic barcode reading devices 57 (only two are represented), with the help of which barcodes attached to products or to ESL 2-19 can be detected by the personnel of the supermarket, in order to establish, in the merchandise management system of the supermarket, an association of the respective ESL 2-19 with the appropriate product. The barcode reading device 57 is WLAN-capable and is in radio contact with the access point 27 with the aid of a WLAN wireless protocol which is symbolized by third radio signals FS3. The access point 27 and the two base stations 25, 26 are connected via a wired network 28 to a merchandise management system server 29 of the supermarket.

Below, with the aid of FIG. 2, the time slot communication method used with the system 1 and forming the first communication protocol is described in detail. The state diagram has time t on the abscissa axis and the communication states of ESL 7-9 indicated as examples and of the first base station 25 on the ordinate axis. Here, T indicates a transmission state and R a reception state of the base station 25, and E indicates a ready-to-receive active state while S indicates an energy-saving sleep state of ESL 7-9 in which there is no readiness to receive.

For a time slot cycle duration DC (for example, 15 seconds), N time slots Z1 . . . ZN (for example, 256) with identical time slot duration DS (for example, approximately 58 milliseconds) are available. During this time slot cycle duration DC, the base station 25 (marked with the symbol "ST") switches between the transmission state T and the rest state R. The transmission state T is always assumed at the beginning of a time slot Z1 . . . ZN and maintained for a synchronization data signal duration DSD (or transmission duration DSD of the synchronization data signal SD), in order to transmit the respective applicable time slot symbol ZS1, ZS2, . . . ZSN with the respective synchronization data signal SD. As the respective time slot signal ZS1 . . . ZSN, the sequential number of the respective time slot Z1 . . . ZN in the order of occurrence of the time slots Z1 . . . ZN is used. Consequently, the first time slot Z1 in hexadecimal notation (marked "Hex") is marked with the time slot symbol Hex 00, the second time slot Z2 is marked with the time slot symbol Hex 01, etc., and the last time slot ZN (in the present example the two hundred and fifty sixth time slot Z256) is marked with the time slot signal Hex FF.

The first ESL 7 is in the synchronized state. It wakes up at a first wakeup time TA1 from its sleep state S and switches to its ready-to-receive active state E with a relatively short lead time DV before an expected occurrence of a synchronization data signal SD, receives the synchronization data signal SD during a reception duration DE with the first time slot symbol ZS1 (Hex 00), establishes, by comparison of the lowest-value byte B0 of its hardware address (Hex 00) with the received time slot symbol ZS1, that the first time slot Z1 intended for the first ESL 7 is displayed (agreement of the bytes to be compared: B0 of the hardware address and first time slot symbol ZS1), retains the parameters of its time control stage, which are used for controlling the wakeup, for the wakeup in the subsequent time slot cycle, in order to define the new wakeup time, and switches back to the sleep state S with a relatively short time lag DN, in order to wake up according to schedule, after the passage of the designated sleep state hold time DR, at the new (second) wakeup time TA2 with said lead time VD before the new start of the first time slot cycle Z1. The same applies analogously to the second ESL 8 which, like the first ESL 7, is in the synchronized state.

Before a synchronization time TSY, the third ESL 9 is in the non-synchronized state which is indicated by the arrow P1 with broken line which runs parallel to the time axis. It wakes up at a randomly selected first wakeup time TA1 and switches from its sleep state S to the ready-to-receive active state E and waits in this state for the reception of the next occurrence of the synchronization data signal SD, wherein, in the present case, the second time slot symbol ZS2 (Hex 01) is received. Based on the lowest-value byte B0 (Hex 00) of its hardware address, the third ESL 9 recognizes that the time slot intended for it in the present time slot cycle already belongs to the past, and consequently the next time slot with the time slot symbol Hex 00 is expected only in the next time slot cycle, and calculates that the instantaneously recognized time slot Z2 lies next to its proper time slot Z1 offset by one time slot, this being referred to as time slot difference below. In the third ESL 9, its time control stage is now programmed so that the new wakeup time TA2, as in the ESL in the synchronized state, occurs with said lead time DV before the occurrence of the first time slot Z1 of the subsequent time slot cycle. The waiting hold time DSA in the sleep state S is calculated automatically. Thus, the third ESL 9 is again in the synchronized state, this being indicated by the second arrow P2 with continuous line, and switches from the active state E to the sleep state S, in order to switch, after the passage of the hold time DSA, back to its active state E at the new wakeup time TA2.

Figure 3:
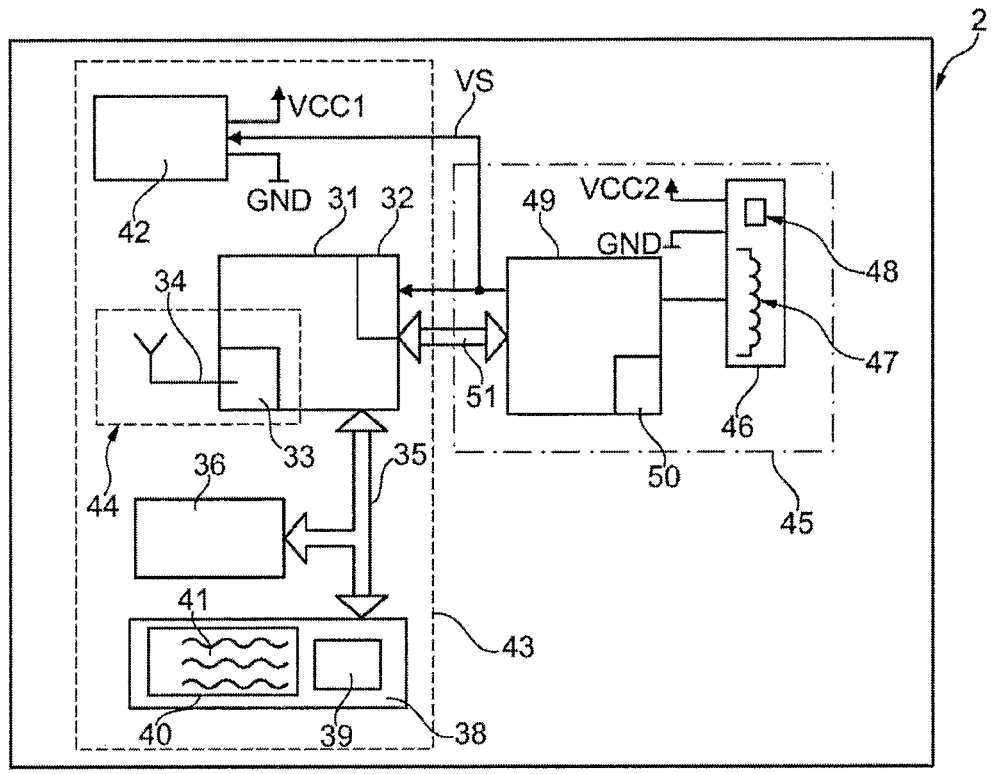
FIG. 3 a block diagram of a display device.

The above described first communication protocol allows an automatic coupling with the respective base station 25, 26, which, however, entails a relatively prolonged process of looking for radio signals in the available radio channels, primarily due to the long phases of the sleep state, until a coupling with a found base station can occur, and, via this base station 25 or 26, a communication with the server 29 can be executed. According to the invention, ESL 2-19, reference being made below to ESL 8 as a representative, have the architecture visualized in FIG. 3, with the aid of which a considerably improved functionality is obtained.

The ESL 8 has a processing stage 31 for the provision of operating states such as, for example, the active state and the sleep state. The processing stage 31 is implemented with the aid of a microcontroller which is coupled to an internal memory 32 and to a co-processor 33 which is coupled to a transmission/reception means 34 for communicating with the base station 25, 26. The processing stage 31 is coupled via a first bus system 35 to an external memory 36 and to a display device 38. The display device 38 has its own microcontroller 39 for display-related data processing, and an electronic ink-based display 40 for visualizing information 41.

A voltage supply stage 42 which is implemented with the aid of a battery 42 provides a first supply voltage VCC1 relative to a reference potential GND for the described electronic components. The described electronic components are marked as display module 43 in FIG. 3. The co-processor 33 and the transmission/reception means 34, of which symbolically only an antenna is visualized, form a first radio interface 44 for the communication according to the above-described time slot communication protocol. With its help, operating states can be controlled, for example, a processing of commands for updating of the display or provision of status information.

However, ESL 8 also comprises an additional interface implemented with the aid of an NFC module 45. The NFC module 45 has analog components 46, to which belong the inductive coupling components 47, visualized as a coil, for the contactless communication with another NFC-capable device (visualized in FIG. 4 as barcode reading device 57), and the voltage supply components 48. In the case of the presence of an inductive coupling, the voltage supply components 48 generate a second supply voltage VCC2 relative to the reference potential GND for supplying the NFC module 45, enabling the operation of its digital components. The digital components are implemented with the aid of a second microcontroller 49 which also comprises an internal memory 50 and which is connected to the analog components 46 for the purpose of communication according to an NFC communication protocol. The NFC module is connected with a second bus 51 to the display module 43, in particular to the first microcontroller 31. The operating system of the NFC module 49 can be stored in the internal memory 50 or else in one of the memories 36, 32 of the display module to which the second microcontroller 49 has access. As soon as the operating system is running, it makes the NFC communication protocol available.

The ESL 8 has an ultra-deep sleep mode which is assumed in a delivery state and in a storage state, and in which practically no energy consumption exists. This is implemented with the aid of a configuration of the voltage supply stage 42 which allows switching on and switching off, a control line for delivering a supply control signal VS by the NFC module, as well as a configuration of the NFC module for generating the supply voltage control signal VS after detection and execution of an on or off supply command. At the time of delivery from the factory, the voltage supply stage 42 is switched off. The voltage supply stage 42 must be activated with the aid of the NFC module 45 as a consequence of an NFC communication with another device, before a readiness to receive for a communication according to the first communication protocol is provided. If, as another consequence, the voltage supply stage 42 is switched off, the storage state exists. In particular during switching off, it can be advantageous for the processing stage 31 to be informed about this process, which is symbolized by the supplying of the supply voltage control signal VS, and thus the data processing is ended in a controlled manner in order to prevent data loss.

Figure 4:
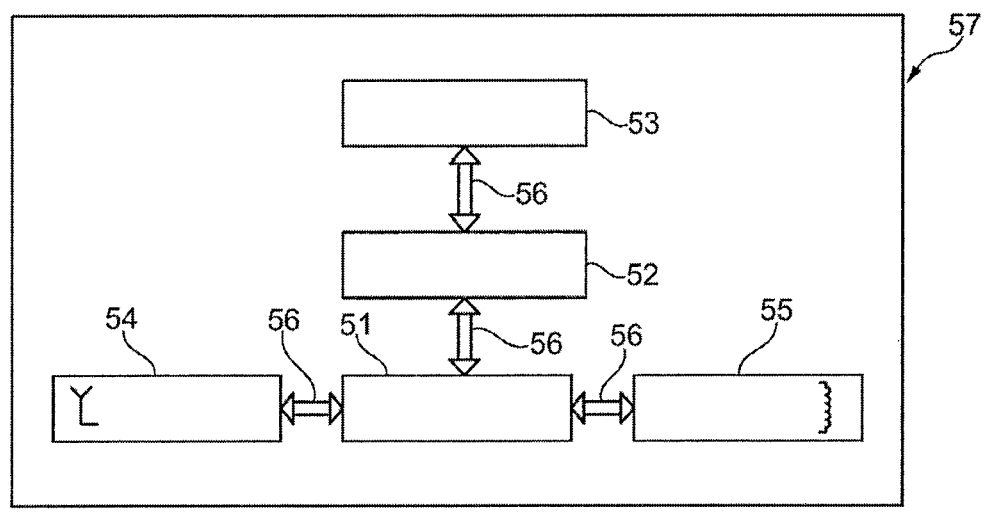
FIG. 4 a block diagram of a portable communication device.

The barcode reading device 57 represented in FIG. 4 comprises a fourth microcontroller 51, a barcode reading stage 52 for reading in and digitizing a barcode, a display/input stage 53 for the interaction with a user, a WLAN communication stage 54 (WLAN communication means are visualized with the aid of an antenna symbol) for communication with the access point 27, and an NFC communication stage 55 (NFC communication means are symbolized with the aid of an inductance (coil)) for communication with the ESL 2-19 according to an NFC communication protocol. The mentioned electronic components are connected to one another with the aid of a data signal bus 56.

The ESL 8 delivered from the factory is in the delivery state. In the supermarket, an employee holds the barcode reading device 57 in the immediate vicinity of the ESL 8, which is indicated in FIG. 1 at the bottom right, and, with the aid of the NFC communication, symbolized with fourth radio signals FS4, he/she transmits a wakeup command to the ESL 8, which is executed in the NFC module 45. From the NFC module 45, the voltage supply stage 42 is switched on, whereupon the electronic components of the display module 43 start operating, and the readiness to receive for receiving data via the first radio interface 44 is started for the first time. Moreover, with the aid of the NFC communication, the network key necessary for the communication via the first radio interface 44 is transmitted, whereupon the ESL 8 performs a connection setup with a radio-available base station, in the present case with the first base station 25.

Figure 2:
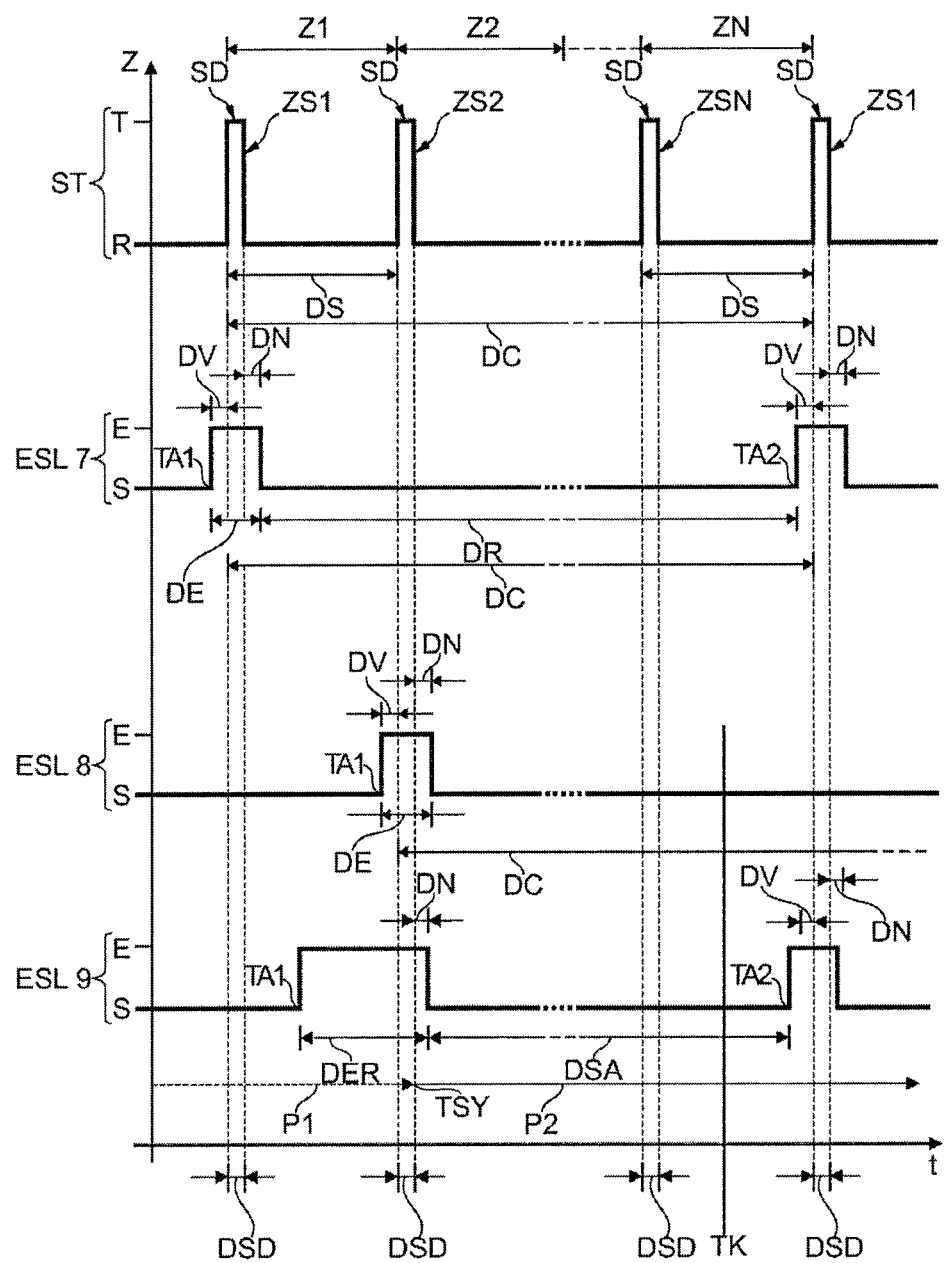
FIG. 2 a state diagram for the explanation of a proprietary communication protocol.

In running operation, with the aid of the NFC module 45, operating states of the ESL 8 can then be controlled or influenced, in fact separately from the scheme of the temporal availability or non-availability of the first radio interface 44, which is predetermined by the first communication protocol, Thus, for example, at time TK represented in FIG. 2, an NFC communication with the ESL 8 can be received. Depending on whether, in the influencing of an operating state, the cooperation with the processing stage 31 or additional electronic components of the display module 43 is necessary or not, a collective or selective activation of these necessary electronic components can occur from the NFC module 45. Here, the readiness to receive of the first radio interface 44 does not have to be established. The voltage supply of the active components can occur with the aid of the first supply voltage VCC1 or also with the aid of the second supply voltage VCC2 available in the NFC module 45, which is then adapted to the necessary value of the first supply voltage VCC1.

With the aid of the NFC module 45, operating parameters such as, for example, the latency time to be used in the communication according to the first communication protocol, can also be set.

If the ESL 8 is moved from one shelf place to another shelf place, for example, because it is needed there, it is possible to initiate an immediate new connection to the available base station 25, 26 with the aid of the NFC module 45 in order to update the display. This is advantageous particularly when the ESL 8 is taken out of the radio range of the first base station 25 and introduced into the radio range of the second base station 26.

In the operation of the ESL 8, in sequential order, the respective operating states, optionally also the respective operating parameters, are stored with the aid of the processing stage 31 in the internal memory 50 to which the processing stage 31 has access. Via the NFC module 45, this data can be read out with the aid of the barcode reading device 57. The ESL 8 can also receive a status display command with the aid of the NFC module 45 and transmit it to the processing stage 31, so that the processing stage 31 visualizes a status with the aid of the display module 40.

During the course of the operation, stock level information, for example regarding a product with which the ESL 8 is associated, can be transmitted from the server 29 with the aid of the first radio interface 44 to the ESL 8 and stored in the ESL 8, for example, in the external memory 36 used as service-side memory. With the aid of the NFC module 45, a service-side display command can be received, transmitted to the processing stage 31, and, under its control, the service information can be visualized with the aid of the display module 40.

With the aid of the NFC module 45, display data can also be received and stored either in the NFC module 45 or in the display module 43 for later visualization. The actual display thereof can be controlled either via the first radio interface 44 or via the NFC module 45.

If, for example, in the daily business operation of the supermarket, it is decided that a merchandise item is to be removed from the range of products and that there is no instantaneous need to operate the associated ESL 8, ESL 8 can be switched with the aid of the NFC module to the storage state in which no energy consumption exists. In the case of renewed need, ESL 8 can also be put back in operation out of the storage state, analogously to the wakeup from the delivery state, and can be incorporated in the radio network of the first or second base station 25, 26.

Also, whenever a barcode reading device has been mentioned in the explained embodiment example, it should be mentioned here that this can be any other NFC communication-capable device which, in addition to its NFC communication capability as well as the possibility of influencing the operating states of an ESL with the aid of the NFC communication capability, can have another functionality or no other functionality at all.

According to another embodiment example, the additional interface can also be configured, for example, as a Bluetooth interface, in particular in accordance with the Bluetooth low energy specification. In this case, a Bluetooth-capable device, for example, a smartphone, which is also WLAN-capable, can be used for controlling or influencing the operating states of the ESL. The Bluetooth communication parameters of the additional interfaces of the different ESL can be collected using the smartphone. In further consequence, the smartphone can be supplied via a WLAN network with information for the individual ESL. With the smartphone, the respective information can be transmitted to the respective ESL in the course of a Bluetooth communication, and the information can be displayed there on the display module 40. According to this embodiment, the smartphone acts as a WLAN gateway for the ESL which has no WLAN capacity. Uninfluenced thereby, the ESL can communicate with a base station 25, 26 via the first radio interface 44 according to the initially explained proprietary first communication protocol. This embodiment example is applicable, for example, in a medical practice, in which the ESL are used for playing back information. The use of an NFC module in the ESL would be impractical in this scenario, because the influencing of the operating states would have to take place over a considerable distance between the location of the secretary's office and the installation site of the ESL, and an NFC communication would not have the necessary range.

Finally, it is pointed out again that the figures described in detail above are only embodiment examples which can be modified by the person skilled in the art in wide variety of ways without leaving the scope of the invention. For the sake of completeness, it is also pointed out that the use of the indefinite article "a" or "an" does not rule out that the features in question can also be present in the plural.

The invention claimed is:

1. A display device (2-19) comprising:
a first radio interface (44) which is connected to a processing stage (31) of the display device (2-19) for communication with a base station (25, 26) according to a first communication protocol for the purpose of controlling states of the processing stage (31); and
an additional interface (45) which is connected to the processing stage (31) for contactless communication according to a second communication protocol with a communication device (57) which is different from the base station (25, 26) for the purpose of controlling states of the display device (2-19);
wherein the additional interface (45) is configured for communication according to a radio frequency identification specification, in particular according to a near field communication specification;
wherein the processing stage (31) is configured to assume an active state for receiving data via the first radio interface 44 and to assume a sleep or rest state in which there is no readiness to receive data via the first radio interface (44) between two active states, wherein the display device (2-19) is configured in such a manner that, at least also during the sleep or rest state, a readiness to receive data via the additional interface (45) exists for the processing state (31);
wherein the processing state (31) is configured to assume a deliver state without readiness to receive data via the first radio interface (44), wherein in the delivery state the processing stage can in fact not switch by itself to the active state, and the display device (2-19), with the help of the additional interface (45), is configured to start for the first time the readiness to receive of the processing stage (31) for receiving data via the first radio interface (44); and
wherein the processing stage (31), before or after the first-time start of the readiness to receive thereof, is configured to receive a network key via the additional interface (45) for the purpose of communicating with the base station (25, 26), and, after reception of the network key, is configured to assume a connection setup state for the purpose of setting up a radio connection with the base station (25, 26) using the network key via the first radio interface (44).

2. The display device (2-19) according to claim 1, wherein display device (2-19) configured to assume a storage state, in particular after leaving a delivery state for the first time, wherein, in the storage state, no readiness to receive of the processing stage (31) for receiving data via the first radio interface (44) exists.

3. The display device (2-19) according to claim 2, wherein the processing stage (31) is configured to assume the storage state as a consequence of receiving data via the additional interface (45).

4. The display device (2-19) according to claim 2, wherein the processing stage (31) is configured to receive and execute a second reset command received with the aid of the additional interface (45), for assuming the storage state.

5. The display device (2-19) according to claim 1, wherein the processing stage (31) is configured to receive data representing operating parameters via the additional interface (45) and to store this data, wherein the operating parameters influence the states of the display device (2-19) in the communication with the base station (25, 26).

6. The display device (2-19) according to claim 1, wherein the processing stage (31), with the aid of the data that can be received via the additional interface (45), is configured to receive and execute a new connection command for renewed assuming of a connection setup state for the purpose of setting up a radio connection with a base station (25, 26).

7. The display device (2-19) according to claim 6, wherein, during the establishment of the new connection, the processing stage (31) is configured to visualize a state information item which represents the presence of the connection setup state.

8. The display device (2-19) according to claim 1, comprising a status memory (50) for storing status data representing a current state and/or a past state, wherein the display device (2-19), with the aid of a status readout command received via the additional interface (45), is configured to assume a status data readout state in which the status data is read out and delivered via the additional interface (45).

9. The display device (2-19) according to claim 8, wherein the additional interface (45) is configured to execute the readout command and to access and read out the status memory, wherein the status memory is a part of the processing means (31) or part of the additional interface (45).

10. The display device (2-19) according to claim 1, wherein the processing stage (31) is configured to receive a status display command via the additional interface (45) and to assume, as a consequence of such a reception, a status display state, in which a status information item stored in the status memory, which represents an operating state of the display device (2-19), is delivered to a display module (43) of the display device (2-19) for the purpose of displaying the status information.

11. The display device (2-19) according to claim 1, wherein the processing stage (31) is configured to receive a service-side display command via the additional interface (45) and to assume, as a consequence of such a reception, a service-side display state, in which a service information item stored in a service-side memory is delivered to a display module (43) of the display device (2-19) for the purpose of displaying the service information, wherein the service information has been received beforehand via the first radio interface (44) and stored in the service-side memory.

12. The display device (2-19) according to claim 1, wherein the processing stage (31) is configured to receive display data via the additional interface (45) and to store, for the purpose of later visualization and/or immediate visualization, the display information represented with the aid of the display data.

13. The display device (2-19) according to claim 1, wherein the processing stage (31) is configured to receive and execute a first reset command received with the aid of the additional interface (45), for assuming the delivery state.

\* \* \* \* \*